United States Patent
Nammi et al.

(10) Patent No.: US 9,894,704 B2
(45) Date of Patent: Feb. 13, 2018

(54) TIMER CONFIGURATION FOR REDUCED CHANNEL STATE INFORMATION REPORTING IN A WIRELESS COMMUNICATION SYSTEM

(71) Applicant: Telefonaktiebolaget LM Ericsson (publ), Stockholm (SE)

(72) Inventors: Sairamesh Nammi, Bedminster, NJ (US); Nianshan Shi, Järfälla (SE); Hongxia Zhao, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/312,514

(22) PCT Filed: Feb. 11, 2015

(86) PCT No.: PCT/SE2015/050165
§ 371 (c)(1),
(2) Date: Nov. 18, 2016

(87) PCT Pub. No.: WO2015/178817
PCT Pub. Date: Nov. 26, 2015

(65) Prior Publication Data
US 2017/0099697 A1 Apr. 6, 2017

Related U.S. Application Data

(60) Provisional application No. 62/000,610, filed on May 20, 2014.

(51) Int. Cl.
*H04W 4/00* (2009.01)
*H04W 76/04* (2009.01)
(Continued)

(52) U.S. Cl.
CPC ........ *H04W 76/046* (2013.01); *H04B 7/0626* (2013.01); *H04L 5/0048* (2013.01);
(Continued)

(58) Field of Classification Search
CPC ... H04W 76/046; H04W 72/08; H04W 88/02; H04W 88/0812; H04B 7/0626; H04L 5/0048; H04L 43/16
(Continued)

(56) References Cited

U.S. PATENT DOCUMENTS

2012/0134275 A1  5/2012  Choi et al.
2013/0064107 A1  3/2013  Sridhar
(Continued)

FOREIGN PATENT DOCUMENTS

EP   2903333 A1    8/2015
WO   2006104341 A2  10/2006
(Continued)

OTHER PUBLICATIONS

Unknown, Author, "Need of assistance information", NEC, 3GPP TSG RAN2 Meeting #85, R2-140510, Prague, Czech Republic, Feb. 10-14, 2014, 1-8.

*Primary Examiner* — Wayne Cai
(74) *Attorney, Agent, or Firm* — Murphy, Bilak & Homiller, PLLC

(57) ABSTRACT

A method for Radio Resource Control—RRC—configuration comprises obtaining (210) User Equipment—UE—condition parameters. The UE condition parameters comprise at least a round trip time and a scheduler processing time. A timer value recommendation for the particular UE is calculated (220) in the Node B. The timer value recommendation is equal or larger than a sum of the round trip time and the scheduler processing time. The timer value recommendation is transmitted (230) to a Radio Network Controller—
(Continued)

RNC. The RNC receives (260) the timer value recommendation. A RRC configuration is performed (280) by the RNC with a timer value according to the timer value recommendation. Alternatively, the timer value recommendation is calculated in the RNC based on UE condition parameters provided by the Node B. Node B's and RNC performing these methods are also presented as well as computer programs and computer program products therefore.

18 Claims, 13 Drawing Sheets

(51) Int. Cl.
*H04B 7/06* (2006.01)
*H04L 5/00* (2006.01)
*H04L 12/26* (2006.01)
*H04W 72/08* (2009.01)
*H04W 88/12* (2009.01)
*H04W 88/08* (2009.01)
*H04W 88/02* (2009.01)

(52) U.S. Cl.
CPC ............ *H04L 43/16* (2013.01); *H04W 72/08* (2013.01); *H04W 88/02* (2013.01); *H04W 88/08* (2013.01); *H04W 88/12* (2013.01)

(58) Field of Classification Search
USPC .................. 455/434, 450; 370/329, 335, 341
See application file for complete search history.

(56) References Cited

U.S. PATENT DOCUMENTS

| 2014/0133333 | A1 | 5/2014 | Liu et al. |
| 2014/0204915 | A1* | 7/2014 | Pelletier ............... H04B 7/0404 370/335 |
| 2014/0341039 | A1 | 11/2014 | Rubin et al. |

FOREIGN PATENT DOCUMENTS

| WO | 2011162934 A1 | 12/2011 |
| WO | 2013184613 A2 | 12/2013 |
| WO | 2014023230 A1 | 2/2014 |
| WO | 2014051387 A1 | 4/2014 |
| WO | 2014069748 A1 | 5/2014 |
| WO | 2014142592 A1 | 9/2014 |

\* cited by examiner

TIMER CONFIGURATION FOR REDUCED CHANNEL STATE INFORMATION REPORTING IN A WIRELESS COMMUNICATION SYSTEM

TECHNICAL FIELD

The proposed technology generally relates to devices and methods for handling channel state information, and in particular to methods for assisting in Radio Resource Control configuration, methods for Radio Resource Control configuration, Node B's, Radio Network Controllers, computer programs, and carriers comprising the computer programs, for configuration of timer values relating to reduced channel Quality Information reporting in a wireless communication system.

BACKGROUND

In uplink HSPA (High-Speed Packet Access) all users are transmitting using same spreading codes and users are separated by non-orthogonal scrambling codes. This results that users in uplink HSPA transmissions need to share an interference limited resource. Reducing the interference in uplink frequencies is thereby critical to ensure high SIR (Signal-to-Interference Ratio) levels on uplink transmission channel and to maintain a stable system operation.

The HS-DPCCH (High-Speed Dedicated Physical Control Channel) transmissions from all UEs (User Equipments) contribute to the interference level and the Rise over Thermal (RoT) in uplink. However, there are scenarios where the HS-DPCCH transmissions could be reduced for lowering the RoT and enabling higher system throughput capacity or increasing coverage.

In one HS-DPCCH sub-frame, the Channel-Quality Indicator (CQI) is transmitted in the 2nd and 3rd slots, and is the key indicator for HSDPA (High-Speed Downlink Packet Access) down-link channel quality and its frequent reporting is essential to maintain a good DL (downlink) throughput.

The CQI is signaled from UE to Node B on one or several uplink HS-DPCCH physical channels, together with other channel state information, depending on configured downlink transmission mode.

FIG. 1 shows the messages exchanged between Node-B and the UE during typical data call set up when the UE is configured with only one carrier. From the common pilot channels, P-CPICH and S-CPICHs when needed, UE estimates the channel, computes the channel quality information and pre-codes channel indicator. This information along with hybrid ARQ (Automated Repeat-reQuest) ACK/NAK (Acknowledgement/Negative acknowledgement) is reported to Node-B using dedicated physical control channel, HS-DPCCH. The structure of HS-DPCCH for a single carrier is shown in FIG. 2 when the UE is configured in non MIMO (Multiple-Input Multiple-Output) mode. It can be seen from FIG. 2 that in the first slot HARQ (Hybrid ARQ) ACK is transmitted (10 bits) and in the 2nd and 3rd slots CQI information is transmitted (20 bits). Note that CQI of 5 bits is block encoded (Reed Muller code) to form 20 bits.

Once the Node-B receives this information, it allocates the required channelization codes, modulation and coding to the UE after scheduling. This information is conveyed to UE by high-speed shared control channel (HS-SCCH), see FIG. 1. Once the UE detects the HS-SCCH, downlink transmission starts through data traffic channel using High-Speed Physical Downlink Shared Channel (HS-PDSCH).

According to the CSI (Channel State Information) reduction technique, the RNC (Radio Network Controller) configures the UE with two reporting periods, the primary and the secondary, during the RRC (Radio Resource Control) configuration. For example the RNC configures a low value for frequent reporting (normal or primary) and a high value for non-frequent reporting (secondary).

With reference to FIG. 3, at first the UE reports the CQI with the primary reporting period, i.e. it operates in a high reporting cycle. However, during say N successive Transmission Time Intervals (TTI's) if it is not scheduled then the UE assumes that there is no data to be scheduled in the downlink direction on that carrier and goes to the secondary reporting period for CSI, i.e. the UE operates in a low reporting cycle. Note that the UE decodes the downlink control channel (HS-SCCH) to identify whether it is scheduled or not. The value of N is configured by the RNC during the data call setup.

When the UE is reporting CSI using secondary reporting period, whenever it receives HS-SCCH correctly, it will move to primary reporting period starting from that TTI or with some reference TTI.

Configuring the timer value, N, is a tricky problem. If the timer value is very high, then the UE does not move to the higher cycle lengths even though there is no data to be transmitted in the downlink direction. If the timer value is very small, the UE switches between low reporting cycle and high reporting cycle often.

For example, let's say the Node B schedules the UE and send this information using HS-SCCH and say the UE didn't receive this (CRC (Cyclic Redundancy Check) failure), then if the timer value is very small, it will move to the higher reporting cycle. Since the Node B does not know that the UE moved to higher reporting cycle it assumes that the UE is reporting HS-DPCCH in low reporting cycle and tries to detect during these periods. If the UE is scheduled with the random CQIs there is a high probability that these packets will be a failure and decrease in the UE throughput.

SUMMARY

It is an object to provide methods and devices that reduces or avoid frequent transition between the reporting cycles. This and other objects are met by embodiments of the proposed technology. Methods and devices to configure the timer value relating to the reduced channel Quality Information reporting are presented. The proposed technology propose that the timer value is determined by explicit or implicit recommendations from the base station or Node B. The recommendations preferably depends on the Round Trip Time, the scheduler processing time and most preferably also on the load of the cell.

In a first aspect, a method for assisting in Radio Resource Control configuration comprises obtaining, in a Node B, User Equipment condition parameters concerning a particular User Equipment connected to the Node B. The User Equipment condition parameters comprise at least a round trip time and a scheduler processing time. A timer value recommendation for the particular User Equipment is calculated in the Node B, in dependence on the User Equipment condition parameters. The timer value recommendation is equal or larger than a sum of the round trip time and the scheduler processing time. The timer value recommendation is transmitted from the Node B to a Radio Network Controller.

In a second aspect, a method for Radio Resource Control configuration comprises receiving, in a Radio Network Controller from a Node B, a timer value recommendation. A Radio Resource Control configuration is performed by the Radio Network Controller with a timer value according to the timer value recommendation, whereby the Radio Resource Control configuration is performed explicitly recommended by the Node B.

In a third aspect, a method for assisting in Radio Resource Control configuration comprises obtaining, in a Node B, User Equipment condition parameters concerning a particular User Equipment connected to the Node B. The User Equipment condition parameters comprise at least a round trip time and a scheduler processing time. The User Equipment condition parameters are transmitted from the Node B to a Radio Network Controller. The User Equipment condition parameters thus constitute implicit recommendations for a Radio Resource Control configuration.

In a fourth aspect, a method for Radio Resource Control configuration comprises receiving, in a Radio Network Controller from a Node B, User Equipment condition parameters concerning a particular User Equipment connected to the Node B. The User Equipment condition parameters comprise at least a round trip time and a scheduler processing time. A timer value recommendation for the particular User Equipment is calculated in the Radio Network Controller, in dependence on the User Equipment condition parameters. The timer value recommendation is equal or larger than a sum of the round trip time and the scheduler processing time. A Radio Resource Control configuration is performed by the Radio Network Controller, with a timer value according to the timer value recommendation. The Radio Resource Control configuration is thus performed implicitly recommended by the Node B.

In a fifth aspect, a Node B is configured to assist in Radio Resource Control configuration. The Node B is configured to obtain User Equipment condition parameters concerning a particular User Equipment connected to the Node B. The User Equipment condition parameters comprise at least a round trip time and a scheduler processing time. The Node B is further configured to calculate a timer value recommendation for the particular User Equipment in dependence on the User Equipment condition parameters. The timer value recommendation is equal or larger than a sum of the round trip time and the scheduler processing time. The Node B is further configured to transmit, from the Node B to a Radio Network Controller, the timer value recommendation.

In a sixth aspect, a Radio Network Controller is configured to configure Radio Resource Control. The Radio Network Controller is configured to receive, from a Node B, timer value recommendation. The Radio Network Controller is further configured to perform a Radio Resource Control configuration with a timer value according to the timer value recommendation. The Radio Resource Control configuration is thus performed explicitly recommended by the Node B.

In a seventh aspect, a Node B is configured to assist in Radio Resource Control configuration. The Node B is configured to obtain User Equipment condition parameters concerning a particular User Equipment connected to the Node B. The User Equipment condition parameters comprise at least a round trip time and a scheduler processing time. The Node B is further configured to transmit, from the Node B to a Radio Network Controller, the User Equipment condition parameters. The User Equipment condition parameters thus constitute implicit recommendations for a Radio Resource Control configuration.

In an eight aspect, a Radio Network Controller is configured to configure Radio Resource Control. The Radio Network Controller is configured to receive, from a Node B, User Equipment condition parameters concerning a particular User Equipment connected to the Node B. The User Equipment condition parameters comprise at least a round trip time and a scheduler processing time. The Radio Network Controller is further configured to calculate a timer value recommendation for the particular User Equipment in dependence on the User Equipment condition parameters. The timer value recommendation is equal or larger than a sum of the round trip time and the scheduler processing time. The Radio Network Controller is further configured to perform a Radio Resource Control configuration with a timer value according to the timer value recommendation. The Radio Resource Control configuration is thus performed implicitly recommended by the Node B.

In a ninth aspect, a computer program comprises instructions, which when executed by at least one processor, cause the at least one processor to obtain User Equipment condition parameters concerning a particular User Equipment connected to the Node B. The User Equipment condition parameters comprise at least a round trip time and a scheduler processing time. The computer program comprises further instructions, which when executed by the at least one processor, cause the at least one processor to calculate a timer value recommendation for the particular User Equipment in dependence on the User Equipment condition parameters. The timer value recommendation is equal or larger than a sum of the round trip time and the scheduler processing time. The computer program comprises further instructions, which when executed by the at least one processor, cause the at least one processor to transmit, to a Radio Network Controller, the timer value recommendation.

In a tenth aspect, a computer program comprises instructions, which when executed by at least one processor, cause the at least one processor to receive, from a Node B, timer value recommendation. The computer program comprises further instructions, which when executed by the at least one processor, cause the at least one processor to perform a Radio Resource Control configuration with a timer value according to the timer value recommendation. The Radio Resource Control configuration is thus performed explicitly recommended by the Node B.

In an eleventh aspect, a computer program comprises instructions, which when executed by at least one processor, cause the at least one processor to obtain User Equipment condition parameters concerning a particular User Equipment connected to a Node B. The User Equipment condition parameters comprise at least a round trip time and a scheduler processing time. The computer program comprises further instructions, which when executed by the at least one processor, cause the at least one processor to transmit, to a Radio Network Controller, the User Equipment condition parameters. The User Equipment condition parameters thus constitute implicit recommendations for a Radio Resource Control configuration.

In a twelfth aspect, a computer program comprises instructions, which when executed by at least one processor, cause the at least one processor to receive User Equipment condition parameters concerning a particular User Equipment connected to a Node B. The User Equipment condition parameters comprise at least a round trip time and a scheduler processing time. The computer program comprises further instructions, which when executed by the at least one processor, cause the at least one processor to calculate a timer value recommendation for the particular User Equipment in dependence on the User Equipment condition parameters. The timer value recommendation is equal or larger than a sum of the round trip time and the scheduler processing time. The computer program comprises further instructions, which when executed by the at least one processor, cause the at least one processor to perform a Radio Resource Control configuration with a timer value according to the timer value recommendation. The Radio Resource Control configuration is thus performed implicitly recommended by said Node B.

In a thirteenth aspect, a carrier comprises the computer program of any of the ninth, tenth, eleventh or twelfth aspect. The carrier is one of an electronic signal, an optical signal, an electromagnetic signal, a magnetic signal, an electric signal, a radio signal, a microwave signal, or a computer-readable storage medium.

In a fourteenth aspect, a Node B for assisting in Radio Resource Control configuration comprises an obtaining module for obtaining User Equipment condition parameters concerning a particular User Equipment connected to said Node B. The User Equipment condition parameters comprise at least a round trip time and a scheduler processing time. The Node B further comprises a calculating module for calculating a timer value recommendation for the particular User Equipment in dependence on the User Equipment condition parameters. The timer value recommendation is equal or larger than a sum of the round trip time and the scheduler processing time. The Node B further comprises a transmitting module for transmitting, from the Node B to a Radio Network Controller, the timer value recommendation.

In a fifteenth aspect, A Radio Network Controller for configuring Radio Resource Control comprises a receiving module for receiving, from a Node B, timer value recommendation. The Radio Network Controller further comprises a configuration module for performing a Radio Resource Control configuration with a timer value according to the timer value recommendation. The Radio Resource Control configuration is thus performed explicitly recommended by the Node B.

In a sixteenth aspect, a Node B for assisting in Radio Resource Control configuration comprises an obtaining module for obtaining User Equipment condition parameters concerning a particular User Equipment connected to the Node B. The User Equipment condition parameters comprise at least a round trip time and a scheduler processing time. The Node B further comprises a transmitting module for transmitting, from the Node B to a Radio Network Controller, the User Equipment condition parameters. The User Equipment condition parameters thus constitute implicit recommendations for a Radio Resource Control configuration.

In a seventeenth aspect, A Radio Network Controller for configuration of Radio Resource Control comprises a receiving module for receiving, from a Node B, User Equipment condition parameters concerning a particular User Equipment connected to the Node B. The User Equipment condition parameters comprise at least a round trip time and a scheduler processing time. The Radio Network Controller further comprises a calculating module for calculating a timer value recommendation for the particular User Equipment in dependence on the User Equipment condition parameters. The timer value recommendation is equal or larger than a sum of the round trip time and the scheduler processing time. The Radio Network Controller further comprises a configuration module for performing a Radio Resource Control configuration with a timer value according to the timer value recommendation. The Radio Resource Control configuration is thus performed implicitly recommended by the Node B.

Embodiments of the proposed technology makes it possible to avoid frequent transition between the reporting cycles, hence an efficient utilization of CQI reduction technique to improve the uplink capacity.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
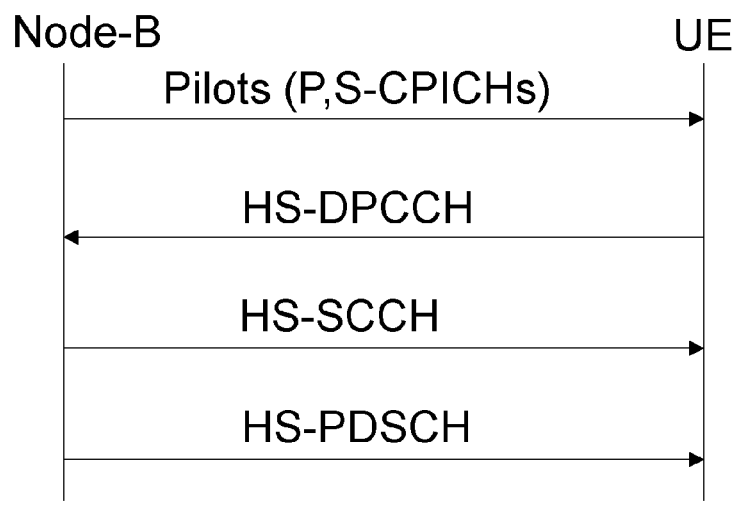
FIG. 1 illustrates messages exchanged between Node-B and UE during a data call setup.
Figure 2:
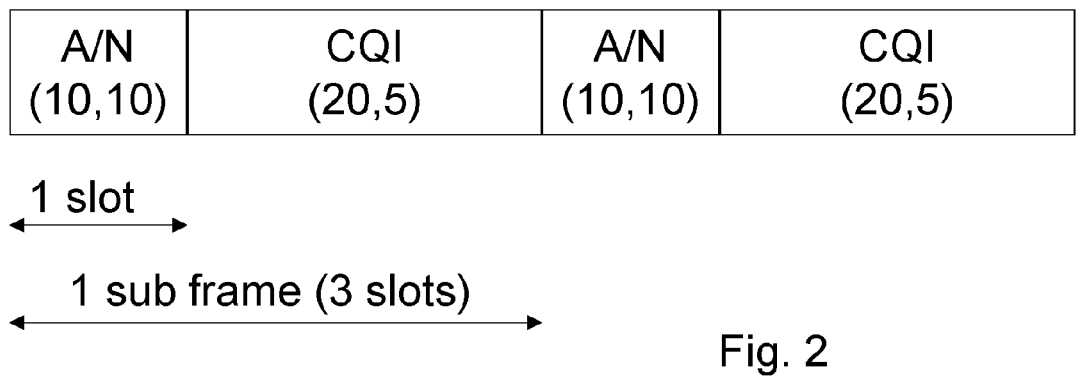
FIG. 2 illustrates a HS-DPCCH structure when the UE is configured in non MIMO mode.
Figure 3:
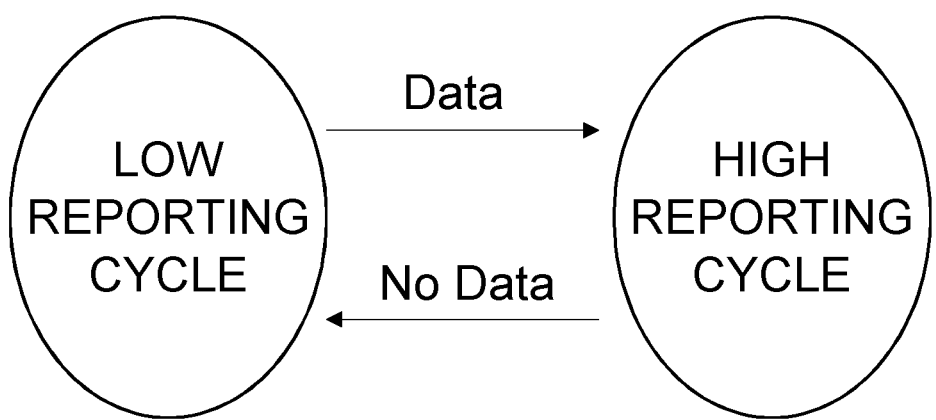
FIG. 3 illustrates two reporting cycles.

Throughout the drawings, the same reference designations are used for similar or corresponding elements.

In some embodiments the non-limiting term radio network node or simply network node is used. It refers in the present disclosure to any type of network node that serves UE and/or connected to other network node or network element or any radio node from where UE receives signal. Examples of radio network nodes are Node B, base station (BS), multi-standard radio (MSR) node such as MSR BS, evolved Node Bs, eNode B, network controller, RNC, base station controller (BSC), relay, donor node controlling relay, base transceiver station (BTS), access point (AP), transmission points, transmission nodes, RRU, RRH, nodes in distributed antenna system (DAS) and also macro/micro/pico radio base stations, home base stations, also known as femto base stations, relay nodes, repeaters, radio access points, base transceiver stations, BTSs, and even radio control nodes controlling one or more Remote Radio Units, RRUs, etc.

In some embodiments the non-limiting term user equipment (UE) is used. It refers in the present disclosure to any type of wireless device that communicates with a radio network node in a cellular or mobile communication system. Examples of UE are target device, device to device (D2D) UE, machine type UE or UE capable of machine to machine (M2M) communication, iPAD, customer premises equipment, CPE, a tablet PC with radio communication capabilities, mobile terminals, a mobile phone, a cellular phone, a Personal Digital Assistant, PDA, equipped with radio communication capabilities, smart phone, a laptop or Personal Computer, PC, equipped with an internal or external mobile broadband modem, laptop embedded equipped (LEE), laptop mounted equipment (LME), USB (Universal Serial Bus) dongles, a portable electronic radio communication device, a sensor device equipped with radio communication capabilities etc. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

The present embodiments are described in particular for multi carrier operation UTRA (Universal Terrestrial Radio Access)/HSPA. The embodiments are however applicable to any RAT (Radio Access Technology) or multi-RAT system where the UE operates using multiple carriers e.g. LTE (Long Term Evolution) FDD (Frequency Division Duplex)/TDD (Time Division Duplex), GSM (Global System for Mobile communication)/GERAN (GSM EDGE RAN), Wi Fi, WLAN (Wireless Local Area Network), WiMax (Worldwide Interoperability for Microwave Access), CDMA2000 (Code Division Multiple Access 2000) etc.

The embodiments are applicable to single carrier as well as to multicarrier (MC) or carrier aggregation (CA) operation of the UE The term carrier aggregation (CA) is also called (e.g. interchangeably called) "multi-carrier system", "multi-cell operation", "multi-carrier operation", "multi-carrier" transmission and/or reception.

Note that the solutions outlined equally applies for Multi RAB (radio bearers) on some carriers (that is data plus speech is simultaneously scheduled).

The timer value N is the number of TTIs that a certain UE, without being scheduled in the downlink direction, is allowed to remain in the primary reporting period.

According to technology presented herein, the timer value, N, is configured as usual by a radio network controller, but upon recommendation or at least based on information obtained from a Node B. This recommended timer value, N, is based on predetermined conditions associated with the particular UE at the particular time. For example, the processing time, the round trip time and the load of the cell and the like are of interest. In one embodiment, the Node B makes the decision about what timer value to recommend and transfers this recommendation to the RNC. In another embodiment, the Node B transfers the predetermined conditions upon which the decision about the recommended timer value is based to the RNC and the RNC provides the actual timer value recommendation from these predetermined conditions. However, in this embodiment, the amount of data that is needed to be transferred is larger.

Figure 4:
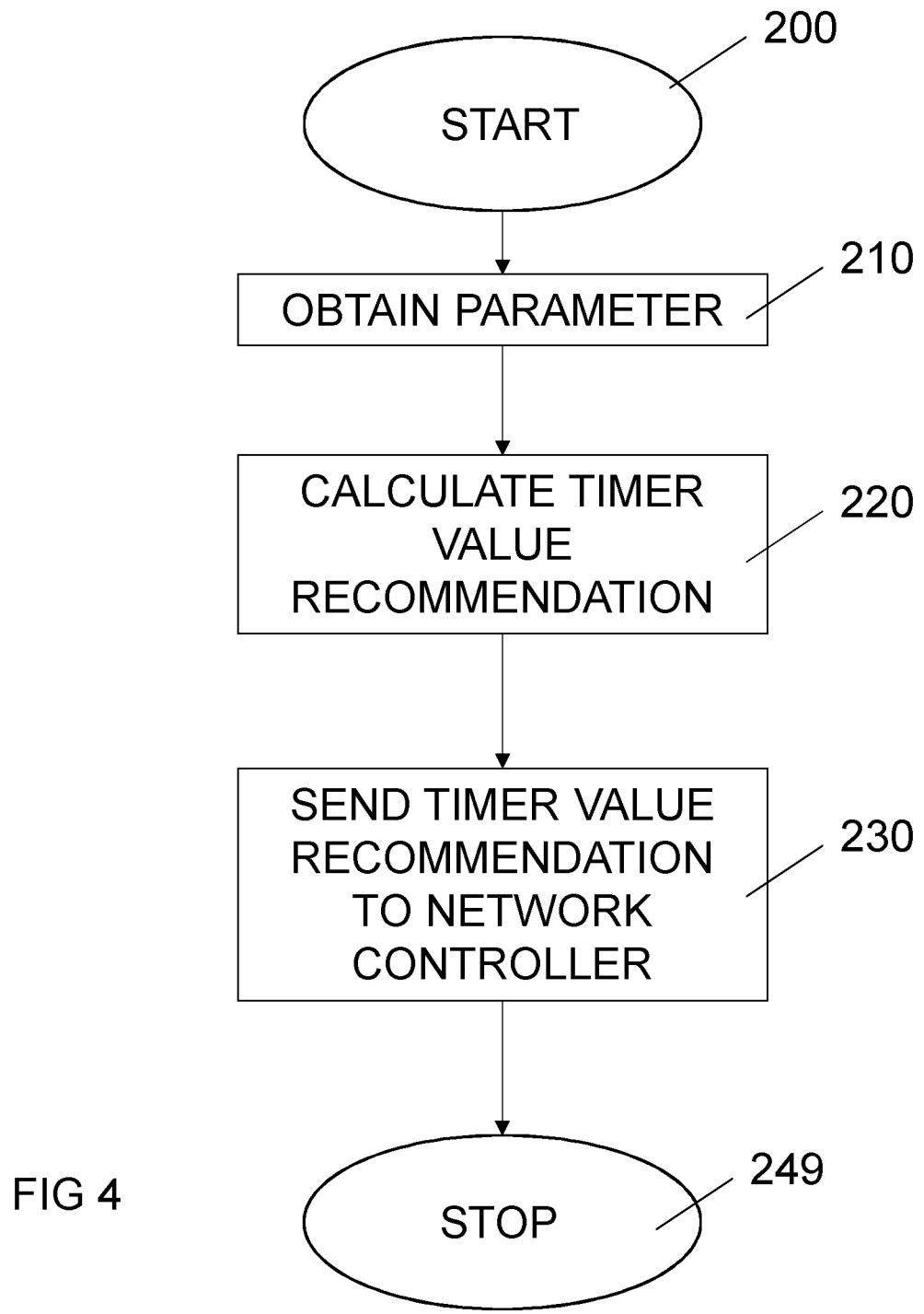
FIG. 4 is a flow diagram of steps of an embodiment of a method for assisting in RRC configuration.

FIG. 4 illustrates a flow diagram of an embodiment of a method, intended to be performed in a Node B, for assisting in RRC configuration. The method starts in step 200. In step 210, the Node B obtains parameters of predetermined conditions associated with the particular UE at the particular time, for example the processing time, the round trip time and/or the load of the cell or the like. In other words, in a Node B, UE condition parameters concerning a particular UE connected to the Node B are obtained, which UE condition parameters comprise at least a round trip time and a scheduler processing time. In step 220, a recommended timer value for RRC configuration is calculated in dependence of the parameters of predetermined conditions. In other words, in the Node B, a timer value recommendation for the particular UE is calculated in dependence on the UE condition parameters obtained in step 210. The timer value recommendation is equal or larger than a sum of the round trip time and the scheduler processing time. In step 230, the recommended timer value is sent to the RNC performing the actual RRC configuration. In other words, the timer value recommendation is transmitted from the Node B to a RNC. The procedure ends in step 249.

In a particular embodiment, the timer value recommendation is equal to a sum of the round trip time, the scheduler processing time and an offset value. In a particular embodiment, the UE condition parameters obtained in step 210 further comprise a load of a cell to which the particular UE is connected. In such a case, step 220 preferably calculates the timer value recommendation with the above mentioned offset being determined dependent on the load of the cell.

In another particular embodiment, the offset is given a first offset value if the load of the cell exceeds a predetermined threshold and the offset is given a second offset value if the load of the cell does not exceed the predetermined threshold. The first offset value is of course larger than the second offset value.

Figure 5:
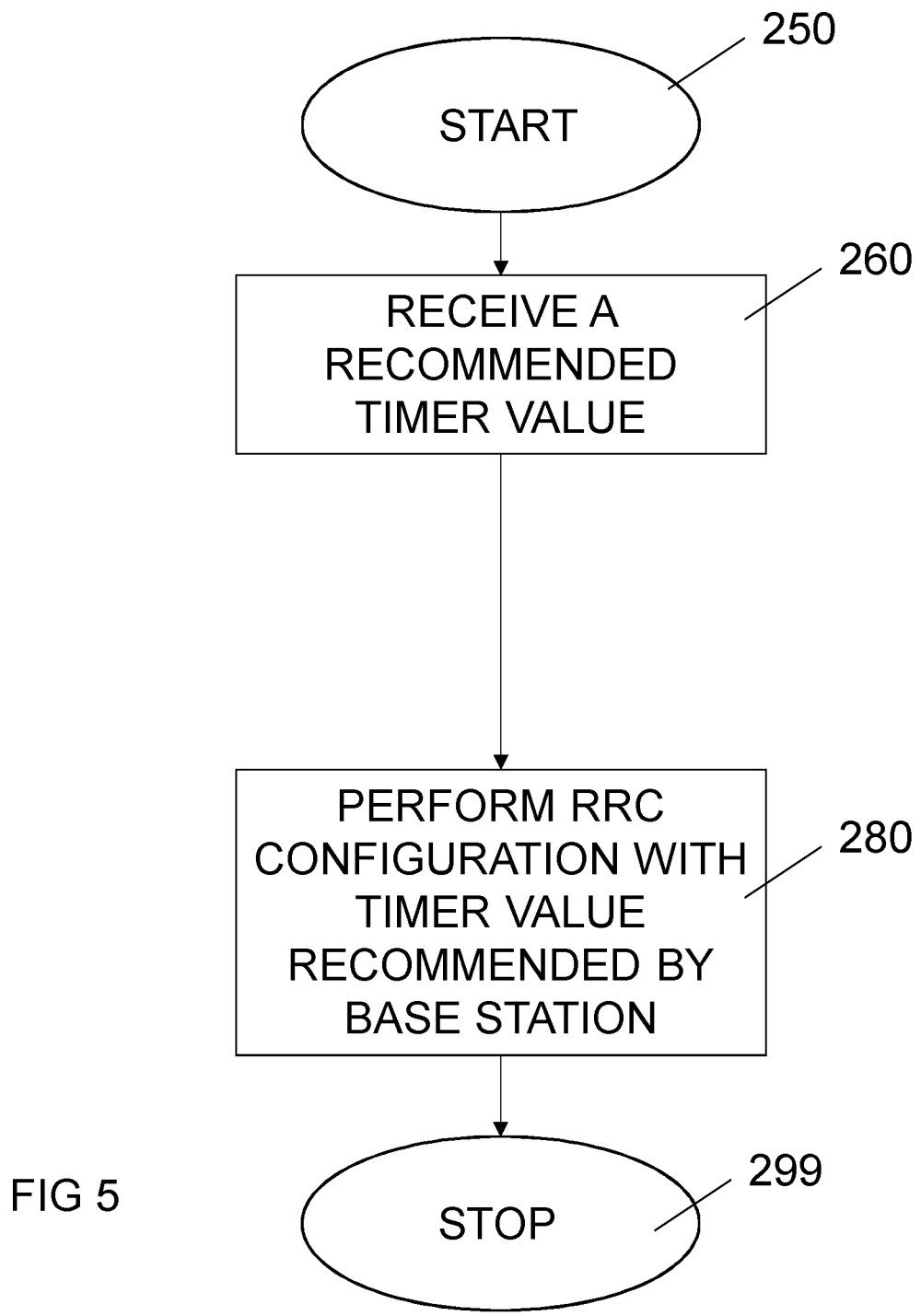
FIG. 5 is a flow diagram of steps of an embodiment of a method for RRC configuration.

FIG. 5 illustrates a flow diagram of an embodiment of a method, intended to be performed in a RNC, for RRC configuration. The method starts in step 250. In step 260, a recommended timer value for RRC configuration is received from a Node B to which a particular UE is connected. In other words, the method comprises receiving, in a RNC from a Node B, a timer value recommendation. In step 280, the RNC performs a RRC configuration. The RNC thereby considers the received recommended timer value, and if there are no other reasons for not following the recommendation, a timer value for determining allowed length of stay in the primary reporting period is equal to the recommended timer value. In other words, the method comprises performing, by the RNC, a RRC configuration with a timer value according to the timer value recommendation. As a consequence, the RNC configures the timer value upon recommendation from Node B, i.e. the RRC configuration is performed explicitly recommended by the Node B. The procedure ends in step 299.

Figure 6:
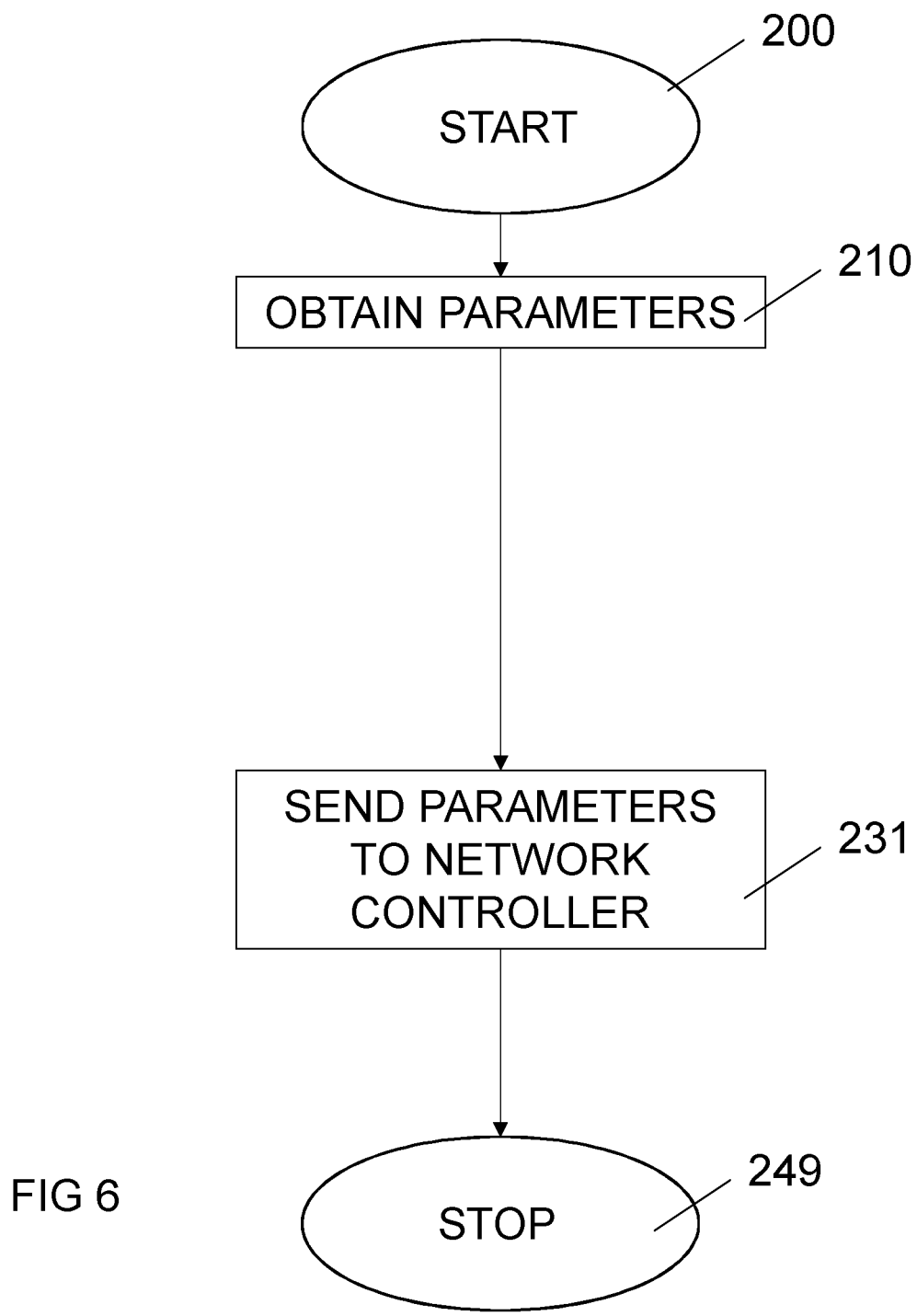
FIG. 6 is a flow diagram of steps of an embodiment of another method for assisting in RRC configuration.

In the embodiments described in FIGS. 5 and 6, the calculation of the timer value recommendation is performed in the Node B, whereas the actual RRC control is performed in the RNC explicitly recommended by the Node B. In other embodiments, the timer value recommendation itself does not have to be computed in the Node B. Instead, the Node B can provide the necessary basic information, and the RNC can then also perform the calculation of the timer value recommendation.

FIG. 6 illustrates a flow diagram of an embodiment of a method, intended to be performed in a Node B, for assisting in RRC configuration. The method starts in step 200. In step 210, the Node B obtains parameters of predetermined conditions associated with the particular Node B at the particular time, for example the processing time, the round trip time and/or the load of the cell or the like. In other words, the method comprises obtaining, in a Node B, UE condition parameters concerning a particular UE connected to the Node B, where the UE condition parameters comprising at least a round trip time and a scheduler processing time. In step 231, the obtained parameters are sent to the RNC performing a calculation of a recommended value and the actual RRC configuration. In other words, the method comprises transmitting, from the Node B to a RNC, the UE condition parameters. The UE condition parameters thereby constitute implicit recommendations for a RRC configuration. The procedure ends in step 249.

Figure 7:
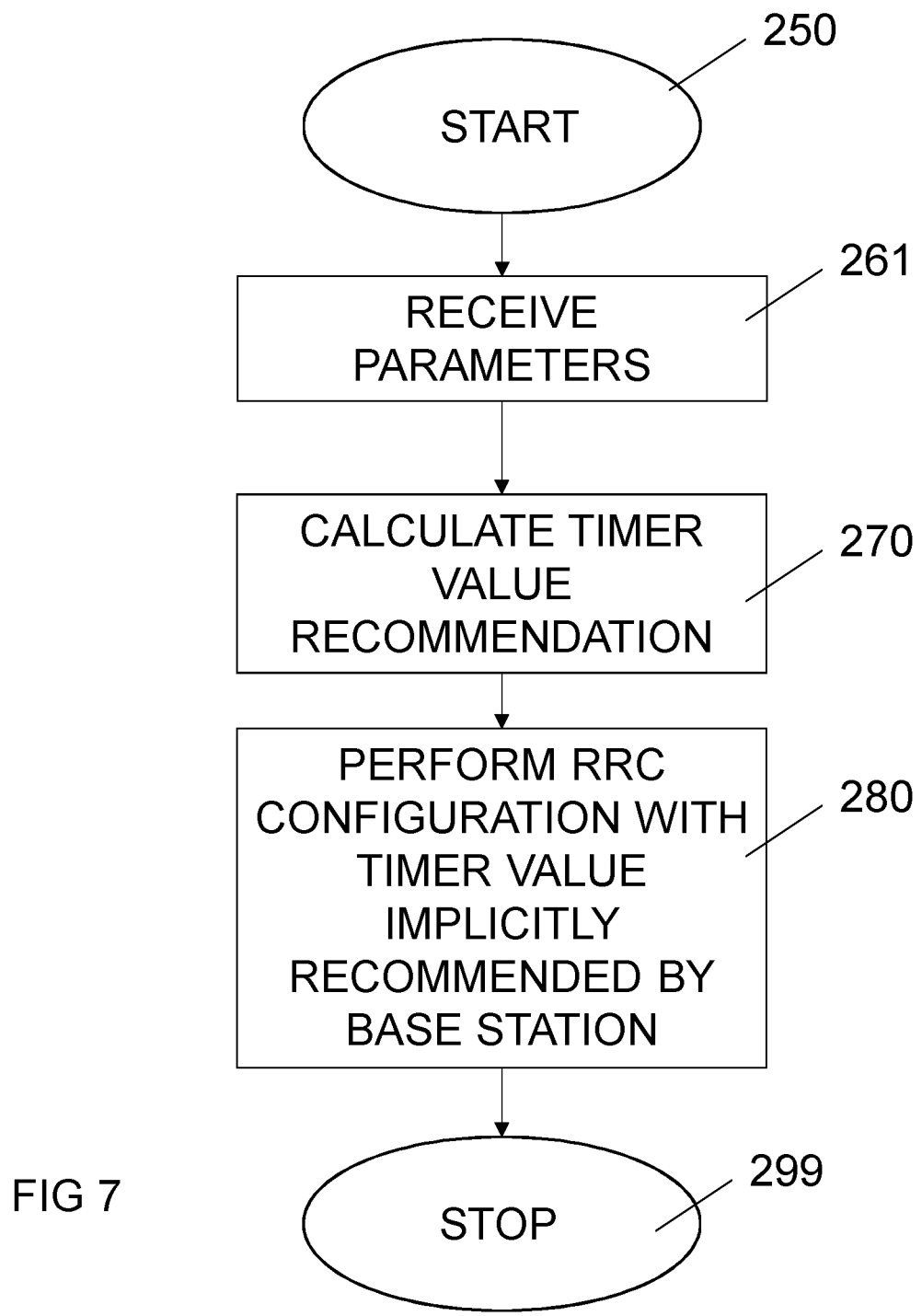
FIG. 7 is a flow diagram of steps of another embodiment of a method for RRC configuration.

FIG. 7 illustrates a flow diagram of an embodiment of a method, intended to be performed in a RNC, for RRC configuration. The method starts in step 250. In step 261, parameters of predetermined conditions associated with a particular UE at the particular time, for example the processing time, the round trip time and/or the load of the cell or the like, is received from a Node B to which the particular UE is connected. In other words, the method comprises receiving, in a RNC from a Node B, UE condition parameters concerning a particular UE connected to the Node B, where the UE condition parameters comprise at least a round trip time and a scheduler processing time. In step 270, a recommended timer value for RRC configuration is calculated in dependence of the received parameters of predetermined conditions. In other words, the method comprises calculating, in the RNC, a timer value recommendation for the particular UE in dependence on the UE condition parameters received in step 261. The timer value recommendation is equal or larger than a sum of the round trip time and the scheduler processing time. In step 280, the RNC performs a RRC configuration. The RNC thereby considers the received recommended timer value, and if there are no other reasons for not following the recommendation, a timer value for determining allowed length of stay in the primary reporting period is equal to the recommended timer value. In other words, the method comprises performing, by the RNC, a RRC configuration with a timer value according to the timer value recommendation. This means that the RRC configuration is performed implicitly recommended by the Node B. The procedure ends in step 299.

In a particular embodiment, the timer value recommendation is equal to a sum of the round trip time, the scheduler processing time and an offset value. In a particular embodiment, the UE condition parameters received in step 261 further comprise a load of a cell to which the particular UE is connected. In such a case, step 270 preferably calculates the timer value recommendation with the above mentioned offset being determined dependent on the load of the cell.

In another particular embodiment, the offset is given a first offset value if the load of the cell exceeds a predetermined threshold and the offset is given a second offset value if the load of the cell does not exceed the predetermined threshold. The first offset value is of course larger than the second offset value.

As indicated further above, in particular embodiments, the Node B or the RNC, respectively, decides the timer value based on the following equation:

Recommended Timer Value=round trip time+processing time.

For example, the round trip time could be 4 TTI. The processing time could be for the next HS-SCCH transmission. Note that the processing time is implementation dependent and a typical value is 3 TTI.

As also indicated further above, in other embodiments, the Node B or the RNC, respectively, recommends the timer value to be:

Recommended Timer Value=round trip time+processing time+offset

The offset is in these embodiments preferably dependent on the load, as mentioned before. In other words, the Node B or RNC recommends the timer value to be based also on the load of the cell. For example, if the load of the cell is greater than some threshold it can be considered as "high load" and is configured with one set of offset values (higher) else it will be configured with another set of offset values (lower).

In another embodiment, the offset values are pre-computed based on different loading levels, rather than only two offset values, and used whenever the loads of the cell changes.

There are many methods to decide the load of a cell at Node B. In one particular embodiment, one simple technique to find out the downlink load of the cell is to check the TTI utilization periodically or aperiodically, since the load is closely related to the TTI utilization. Note that, the invention works for any load determination algorithm.

Figure 8:
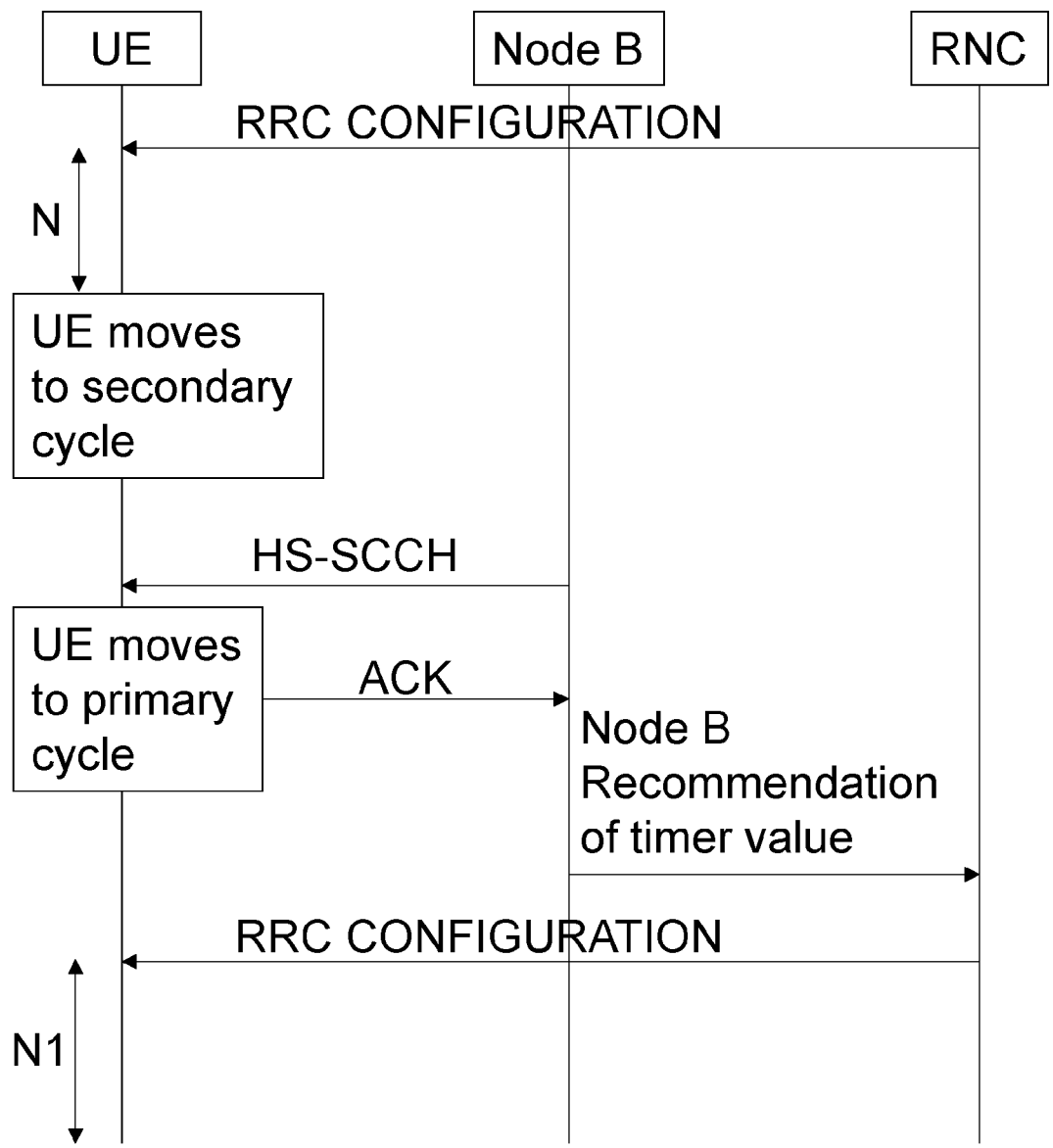
FIG. 8 illustrates a message sequence chart.

FIG. 8 shows the message sequence chart of an embodiment of a proposed algorithm.

In a first step, the RNC sets the value N of the RRC parameters and sends this information to the UE through RRC signalling. The RNC can for instance set the default value for the timer.

In a second step, the UE monitors every TTI for the downlink control channel (HS-SCCH) and if the HS-SCCH is intended for this specific UE, the timer is expired. Else, the timer value is decremented by one TTI. Note that during this period the UE is in the default primary reporting cycle.

In a third step, once the timer is expired, i.e. it reached the value of 0 TTI, then the UE will move to the secondary reporting cycle and keep on monitoring the HS-SCCH.

In a fourth step, if the UE detects an HS-SCCH during any TTI, e.g. when it is in the secondary reporting cycle, which is intended for this specific UE (by CRC check of the UE identity) the UE will move to the primary reporting cycle.

The steps 2, 3, and 4 are repeated until a change of timer value is needed. Thus, in a fifth step, the RNC configures the UE with a different set of timer value upon implicit or explicit recommendation from the Node B. For example, as outlined further above, the Node B recommends using a timer value different from already configured value or the Node B provides parameters on which a timer value can be calculated.

Besides what is explicitly described about the UEs and network nodes, the UE and the network nodes may also include radio circuitry for communication with one or more other nodes, including transmitting and/or receiving information.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, video acceleration hardware, and/or any suitable programmable logic circuitry such as one or more Field Programmable Gate Arrays, FPGAs, or one or more Programmable Logic Controllers, PLCs.

It should also be understood that it may be possible to re-use the general processing capabilities of any conventional device or unit in which the proposed technology is implemented. It may also be possible to re-use existing software, e.g. by reprogramming of the existing software or by adding new software components.

The proposed technology provides an embodiment of a base station or Node B configured to assist in RRC configuration, wherein the base station or Node B is configured to obtain parameters of predetermined conditions associated with the particular UE at the particular time. In other words, the base station or Node B is configured to obtain UE condition parameters concerning a particular UE connected to the Node B. The UE condition parameters comprise at least a round trip time and a scheduler processing time. The base station or Node B is further configured to calculate a recommended timer value for RRC configuration in dependence of the parameters of predetermined conditions. In other words, the base station or Node B is configured to calculate a timer value recommendation for the particular UE in dependence on the UE condition parameters. The timer value recommendation is equal or larger than a sum of the round trip time and the scheduler processing time. The node B or base station is also configured to send the recommended timer value to the RNC performing the actual RRC configuration. In other words, the base station or Node B is configured to transmit, from the Node B to a RNC, the timer value recommendation.

In a particular example, the Node B comprises a processor and a memory, which memory comprises instructions executable by the processor, whereby the node B/processor is operative to obtain parameters of predetermined conditions associated with the particular UE at the particular time, i.e. to obtain the UE condition parameters concerning the particular UE connected to said Node B, and to calculate a recommended timer value for RRC configuration in dependence of the parameters of predetermined conditions, i.e. to calculate the timer value recommendation for the particular UE in dependence on the UE condition parameters.

In a further particular example, the Node B comprises communication circuitry configured to transmit, from the Node B to the RNC, the timer value recommendation, i.e. to send the recommended timer value to the RNC performing the actual RRC configuration.

The proposed technology also provides an embodiment of a base station or Node B configured to assist in RRC configuration, wherein the base station or Node B is configured to obtain parameters of predetermined conditions associated with the particular UE at the particular time. In other words, the base station or Node B is configured to obtain UE condition parameters concerning a particular UE connected to the Node B. The UE condition parameters comprise at least a round trip time and a scheduler processing time. The base station or Node B is further configured to send the obtained parameters of predetermined conditions to the RNC performing the actual RRC configuration. In other words, the base station or the Node B is configured to transmit, from the Node B to a RNC, the UE condition parameters. The UE condition parameters thereby constitute implicit recommendations for a RCC configuration In a particular example, the base station or Node B comprises a processor and a memory, which memory comprises instructions executable by the processor, whereby the Node B/processor is operative to obtain parameters of predetermined conditions associated with the particular UE at the particular time, i.e. to obtain the UE condition parameters concerning the particular UE connected to said Node B.

In a further particular example, the base station or Node B comprises communication circuitry configured to transmit, from the Node B to the RNC, the UE condition parameters, i.e. to send the obtained parameters of predetermined conditions to the RNC performing the actual RRC configuration.

The proposed technology provides an embodiment of a network controller, in particular a RNC, configured to perform a RRC configuration, wherein said network controller is configured to receive a recommended timer value for RRC configuration from a Node B to which a particular UE is connected, i.e. to receive, from a Node B, timer value recommendation. The network controller is further configured to perform a RRC configuration comprising a timer value upon recommendation from Node B, i.e. to perform a RRC configuration with a timer value according to the timer value recommendation. The RRC configuration is thereby performed explicitly recommended by the Node B In a particular example, the network controller comprises a processor and a memory, said memory comprising instructions executable by the processor, whereby the network controller/processor is operative to perform a RRC configuration comprising a timer value upon recommendation from Node B, i.e. to perform the RRC configuration with the timer value according to the timer value recommendation.

In a further particular example, the network controller comprises communication circuitry configured to receive, from the Node B, timer value recommendation, i.e. to receive a recommended timer value for RRC configuration from a Node B to which a particular UE is connected.

The proposed technology also provides an embodiment of a network controller, in particular a RNC, configured to perform a RRC configuration, wherein said network controller is configured to receive parameters of predetermined conditions associated with a particular UE at the particular time from a Node B to which a particular UE is connected. In other words, the RNC is configured to receive, from a Node B, UE condition parameters concerning a particular UE connected to the Node B. The UE condition parameters comprise at least a round trip time and a scheduler processing time. The network controller is further configured to calculate a recommended timer value for RRC configuration in dependence of the received parameters of predetermined conditions. In other words, the RNC is configured to calculate a timer value recommendation for the particular UE in dependence on the UE condition parameters. The timer value recommendation is equal or larger than a sum of the round trip time and the scheduler processing time. The network controller is further configured to perform a RRC configuration comprising a timer value upon implicit recommendation from Node B. In other words, the RNC is configured to perform a RRC configuration with a timer value according to the timer value recommendation. The RRC configuration is thereby performed implicitly recommended by the Node B.

In a particular example, the network controller comprises a processor and a memory, said memory comprising instructions executable by the processor, whereby the network controller/processor is operative to calculate a recommended timer value for RRC configuration in dependence of the received parameters of predetermined conditions, i.e. to calculate the timer value recommendation for the particular UE in dependence on the UE condition parameters, and to perform a RRC configuration comprising a timer value upon implicit recommendation from Node B, i.e. to perform the RRC configuration with the timer value according to the timer value recommendation.

Figure 9:
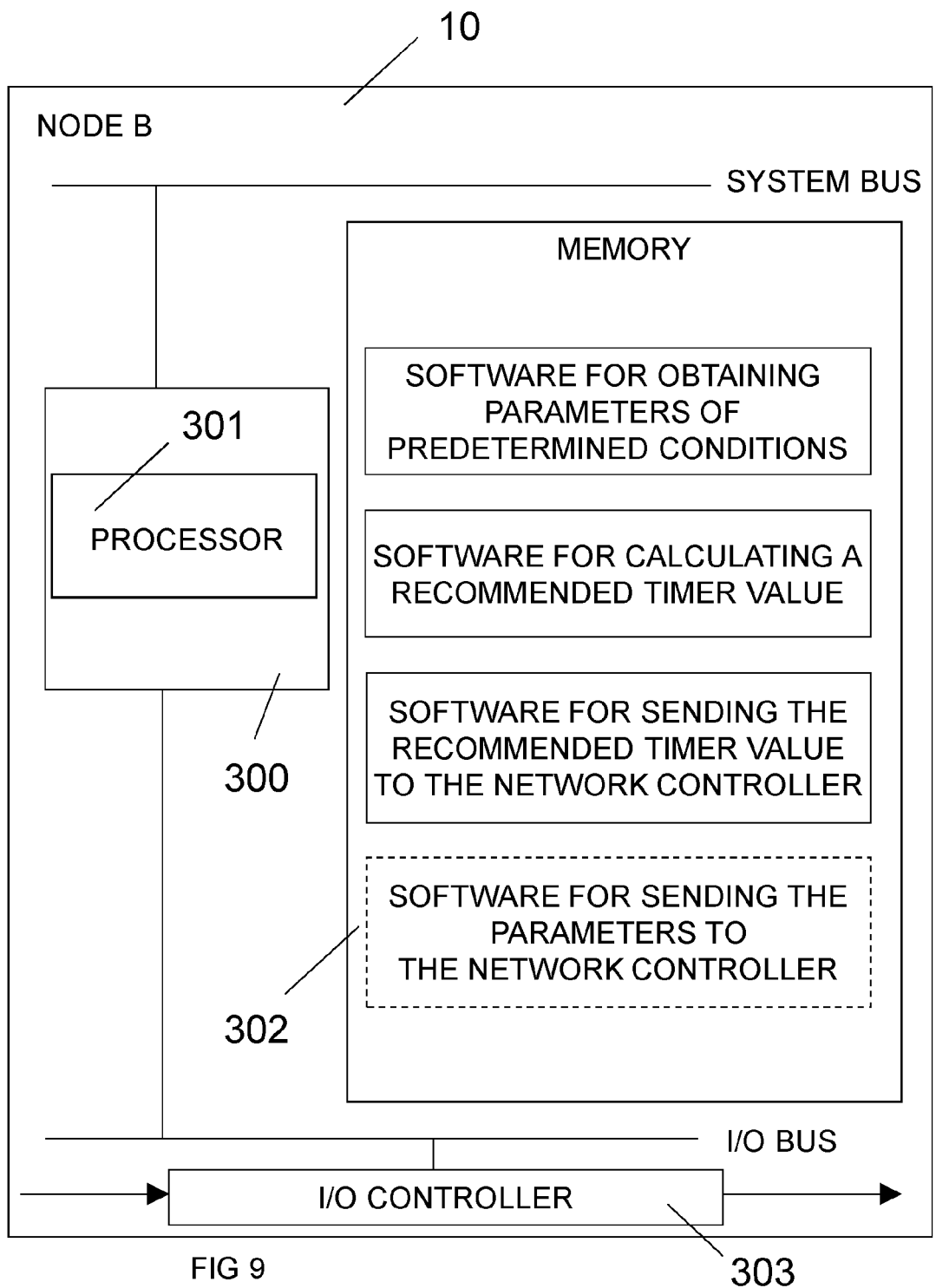
FIG. 9 illustrates an embodiment of a base station.

In a further particular example, the RNC comprises communication circuitry configured to receive, from the Node B, UE condition parameters concerning the particular UE connected to the Node B, i.e. to receive parameters of predetermined conditions associated with a particular UE at the particular time from a Node B to which a particular UE is connected, In the following, an example of a computer implementation will be described with reference to FIG. 9. The base station 10 comprises processing circuitry 300 such as one or more processors 301 and a memory 302. In this particular example, at least some of the steps, functions, procedures, modules and/or blocks described herein are implemented in a computer program, which is loaded into the memory 302 for execution by the processing circuitry 300. The processing circuitry 300 and memory 302 are interconnected to each other to enable normal software execution. An input/output device 303 may also be interconnected to the processing circuitry 300 and/or the memory 302 to enable input and/or output of relevant data such as input parameter(s) and/or resulting output parameter(s).

The term 'computer' should be interpreted in a general sense as any system or device capable of executing program code or computer program instructions to perform a particular processing, determining or computing task.

In a particular embodiment, the computer program comprises instructions, which when executed by at least one processor, cause the processor(s) to obtain parameters of predetermined conditions associated with the particular UE at the particular time, i.e. to obtain UE condition parameters concerning a particular UE connected to the Node B. The UE condition parameters comprise at least a round trip time and a scheduler processing time. The computer program comprises further instructions, which when executed by the processor(s), cause the processor(s) to calculate a recommended timer value for RRC configuration in dependence of the parameters of predetermined conditions, i.e. to calculate a timer value recommendation for the particular UE in dependence on the UE condition parameters. The timer value recommendation is equal or larger than a sum of the round trip time and the scheduler processing time. The computer program comprises further instructions, which when executed by the processor(s), cause the processor(s) to send the recommended timer value to the RNC performing the actual RRC configuration, i.e. to transmit, to a RNC, the timer value recommendation.

In another particular embodiment, the computer program comprises instructions, which when executed by at least one processor, cause the processor(s) to obtain parameters of predetermined conditions associated with the particular UE at the particular time, i.e. to obtain UE condition parameters concerning a particular UE connected to a Node B. The UE condition parameters comprise at least a round trip time and a scheduler processing time. The computer program comprises further instructions, which when executed by the processor(s), cause the processor(s) to send the obtained parameters of predetermined conditions to the RNC performing the actual RRC configuration, i.e. to transmit, to a RNC, the UE condition parameters, whereby the UE condition parameters constitute implicit recommendations for a RRC configuration.

Figure 10:
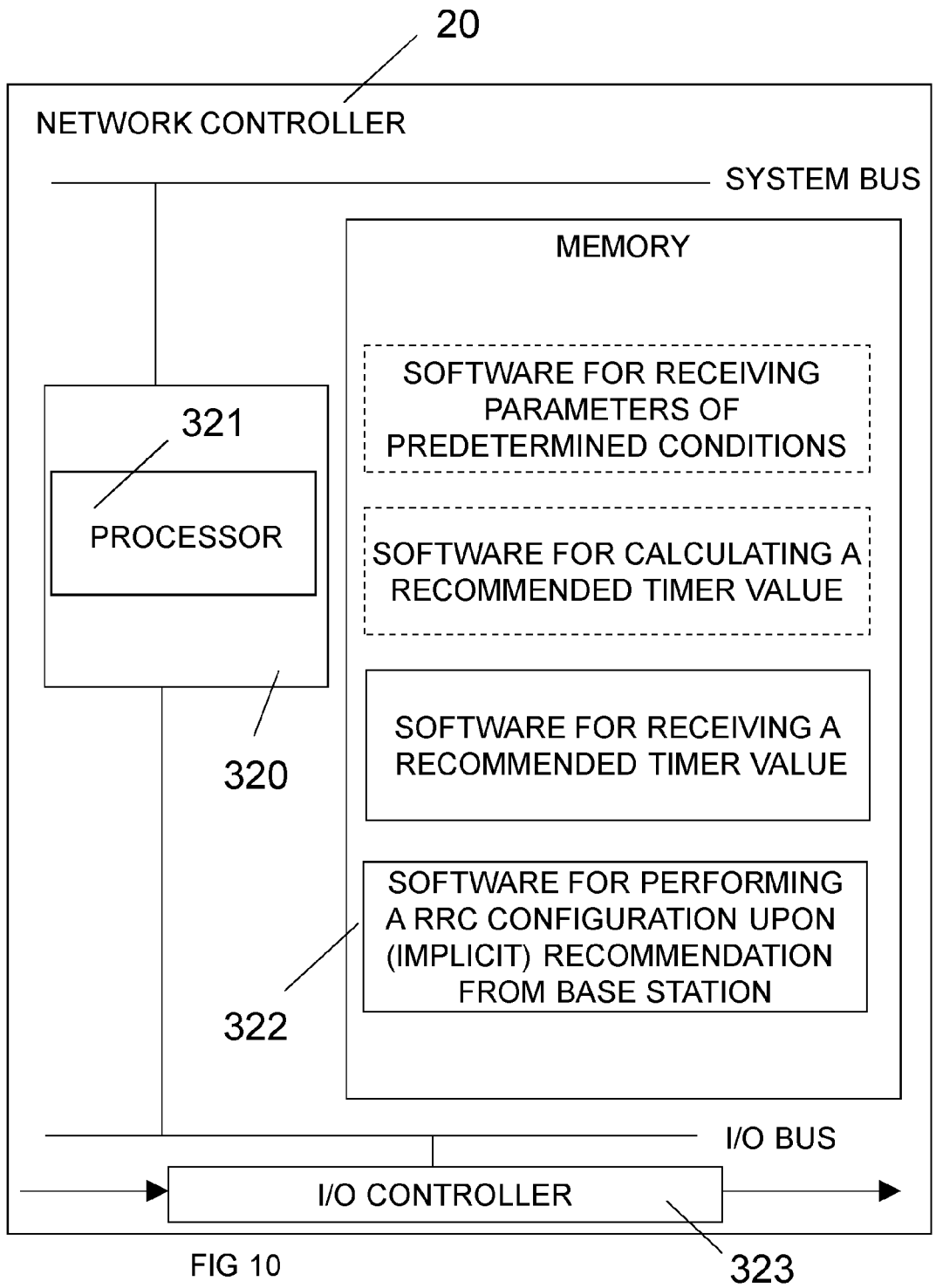
FIG. 10 illustrates an embodiment of a network controller.

In the following, an example of a computer implementation will be described with reference to FIG. 10. The network controller 20 comprises processing circuitry 320 such as one or more processors 321 and a memory 322. In this particular example, at least some of the steps, functions, procedures, modules and/or blocks described herein are implemented in a computer program, which is loaded into the memory 322 for execution by the processing circuitry 320. The processing circuitry 320 and memory 322 are interconnected to each other to enable normal software execution. An input/output device 323 may also be interconnected to the processing circuitry 320 and/or the memory 322 to enable input and/or output of relevant data such as input parameter(s) and/or resulting output parameter(s).

In a particular embodiment, the computer program comprises instructions, which, when executed by at least one processor, cause the processor(s) to receive a recommended timer value for RRC configuration from a Node B to which a particular UE is connected, i.e. to receive, from a Node B, timer value recommendation. The computer program comprises further instructions, which when executed by the processor(s), cause the processor(s) to perform a RRC configuration comprising a timer value upon recommendation from Node B, i.e. to perform a RRC configuration with a timer value according to the timer value recommendation. The RRC configuration is thereby performed explicitly recommended by the Node B.

In another particular embodiment, the computer program comprises instructions, which when executed by at least one processor, cause the processor(s) to receive parameters of predetermined conditions associated with a particular UE at the particular time from a Node B to which a particular UE is connected, i.e. to receive User Equipment condition parameters concerning a particular User Equipment connected to a Node B, said User Equipment condition parameters comprising at least a round trip time and a scheduler processing time. The computer program comprises further instructions, which when executed by the processor(s), cause the processor(s) to calculate a recommended timer value for RRC configuration in dependence of the received parameters of predetermined conditions, i.e. to calculate a timer value recommendation for the particular UE in dependence on the UE condition parameters. The timer value recommendation is equal or larger than a sum of the round trip time and the scheduler processing time. The computer program comprises further instructions, which when executed by the processor(s), cause the processor(s) to perform a RRC configuration comprising a timer value upon implicit recommendation from Node B, i.e. to perform a RRC configuration with a timer value according to the timer value recommendation. The RRC configuration is thereby performed implicitly recommended by the Node B.

The proposed technology also provides an embodiment of a carrier comprising any of the computer program embodiments presented here above, wherein the carrier is one of an electronic signal, an optical signal, an electromagnetic signal, a magnetic signal, an electric signal, a radio signal, a microwave signal, or a computer-readable storage medium.

The software or computer program may thus be realized as a computer program product, which is normally carried or stored on a computer-readable medium. The computer-readable medium may include one or more removable or non-removable memory devices including, but not limited to a Read-Only Memory, ROM, a Random Access Memory, RAM, a Compact Disc, CD, a Digital Versatile Disc, DVD, a Blueray disc, a Universal Serial Bus, USB, memory, a Hard Disk Drive, HDD storage device, a flash memory, a magnetic tape, or any other conventional memory device. The computer program may thus be loaded into the operating memory of a computer or equivalent processing device for execution by the processing circuitry thereof.

As indicated herein, the base station may alternatively be defined as a group of function modules, where the function modules are implemented as a computer program running on at least one processor.

Figure 11:
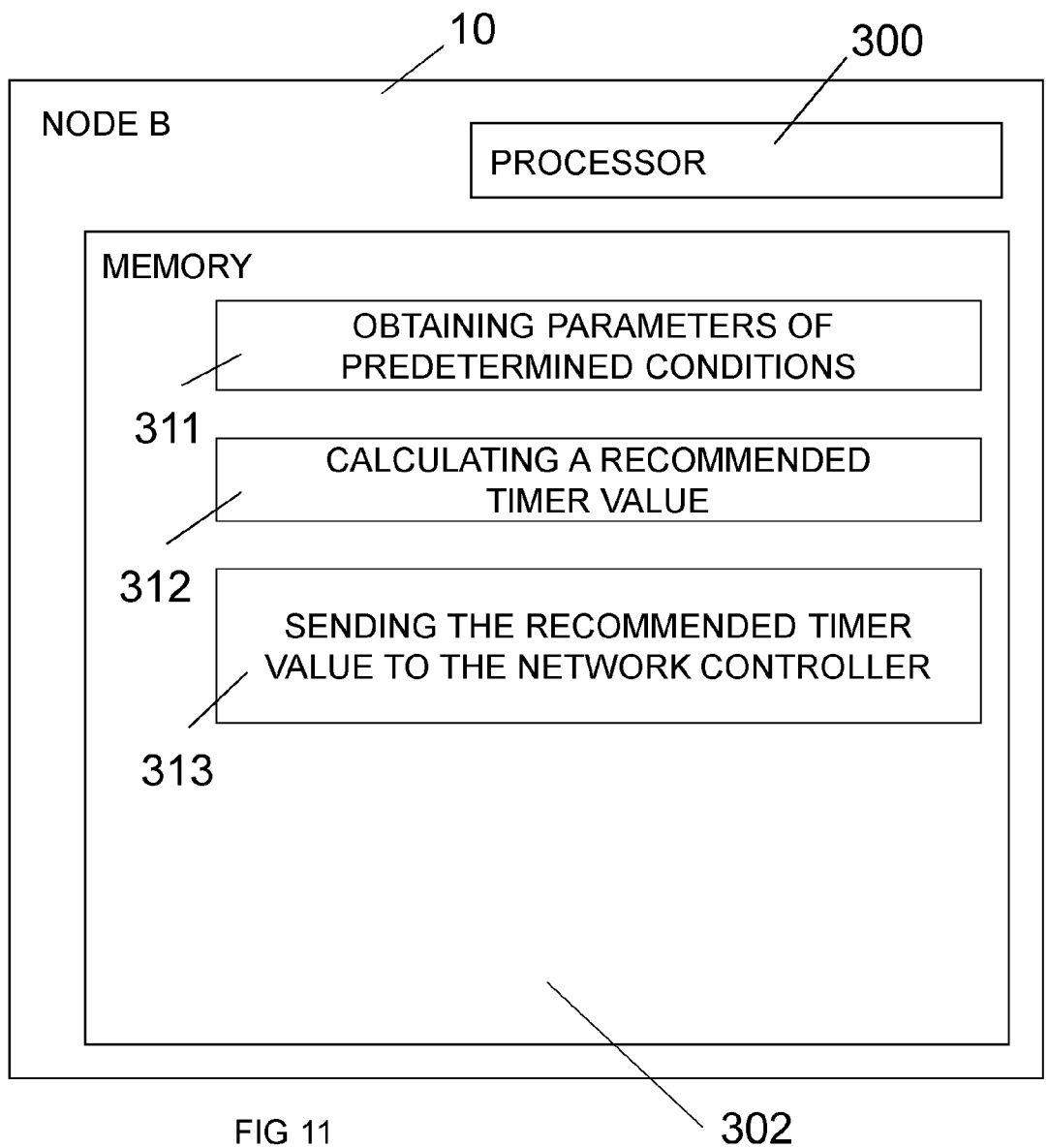
FIG. 11 illustrates an embodiment of a base station.

FIG. 11 is a schematic block diagram illustrating an example of a base station or Node B 10 comprising a processor 300 and an associated memory 302.

The computer program residing in memory may thus be organized as appropriate function modules configured to perform, when executed by the processor, at least part of the steps and/or tasks described herein. An example of such function modules is illustrated in FIG. 11. Function component 311 may implement the functionality of obtaining parameters of predetermined conditions associated with the particular UE at the particular time. Function component 312 may implement the functionality of calculating a recommended timer value for RRC configuration in dependence of the parameters of predetermined conditions. Function component 313 may implement the functionality of sending the recommended timer value to the RNC performing the actual RRC configuration.

In other words, a Node B for assisting in RRC configuration comprises an obtaining module, a calculating module and a transmitting module. The obtaining module obtains UE condition parameters concerning a particular UE connected to the Node B. The UE condition parameters comprise at least a round trip time and a scheduler processing time. The calculating module calculates a timer value recommendation for the particular UE in dependence on the UE condition parameters. The timer value recommendation is equal or larger than a sum of the round trip time and the scheduler processing time. The transmitting module transmits, from the Node B to a RNC, the timer value recommendation.

Figure 12:
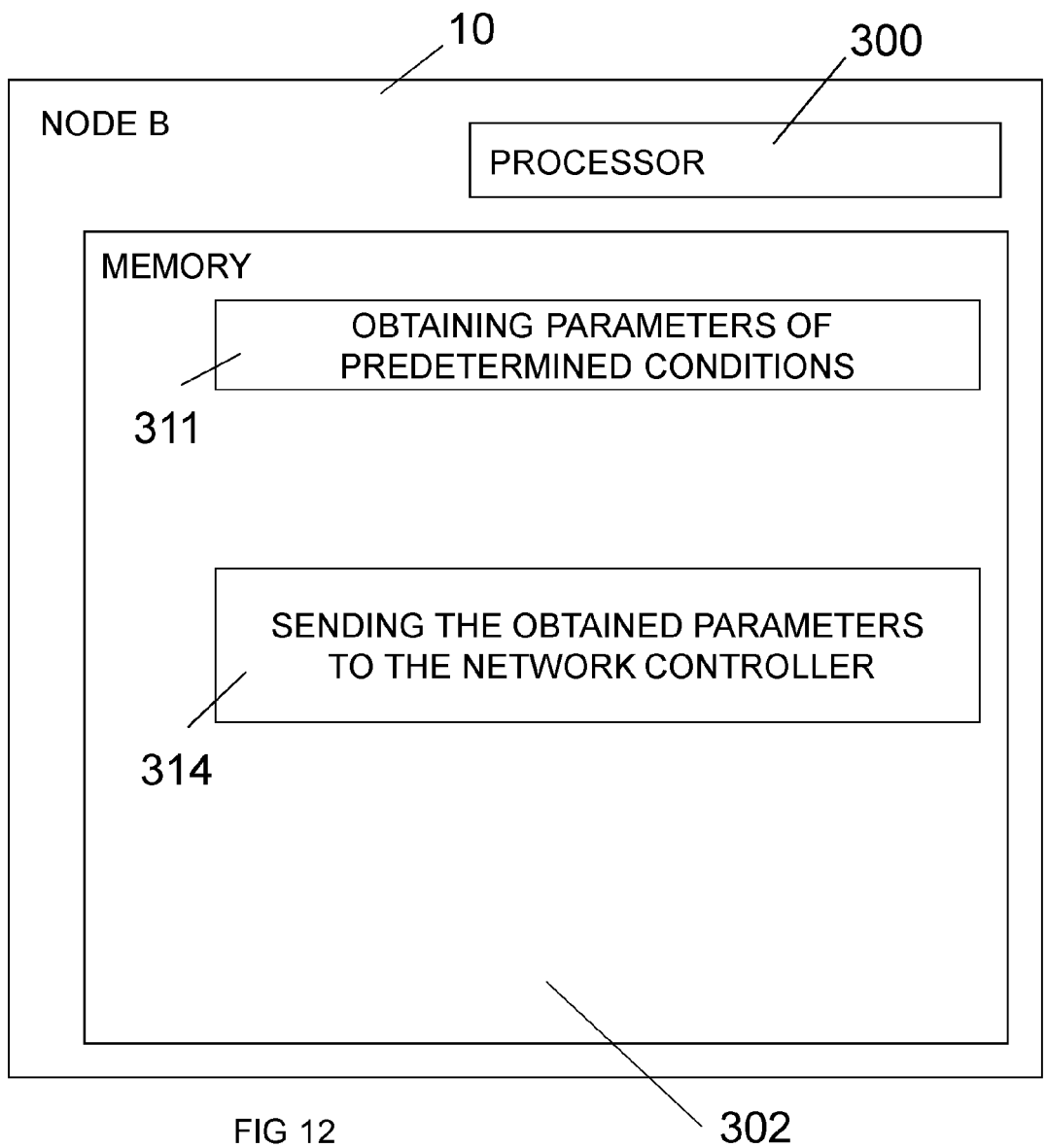
FIG. 12 illustrates another embodiment of a base station.

FIG. 12 is a schematic block diagram illustrating an example of a base station 10 comprising a processor 300 and an associated memory 302.

The computer program residing in memory may thus be organized as appropriate function modules configured to perform, when executed by the processor, at least part of the steps and/or tasks described herein. An example of such function modules is illustrated in FIG. 12. Function component 311 may implement the functionality of obtaining parameters of predetermined conditions associated with the particular UE at the particular time. Function component 314 may implement the functionality of sending the obtained parameters of predetermined conditions to the RNC performing the actual RRC configuration.

In other words, a RNC for configuring RRC comprises a receiving module and a configuration module. The receiving module receives, from a Node B, a timer value recommendation. The configuration module performs a RRC configuration with a timer value according to the timer value recommendation. The RRC configuration is thereby performed explicitly recommended by the Node B.

Figure 13:
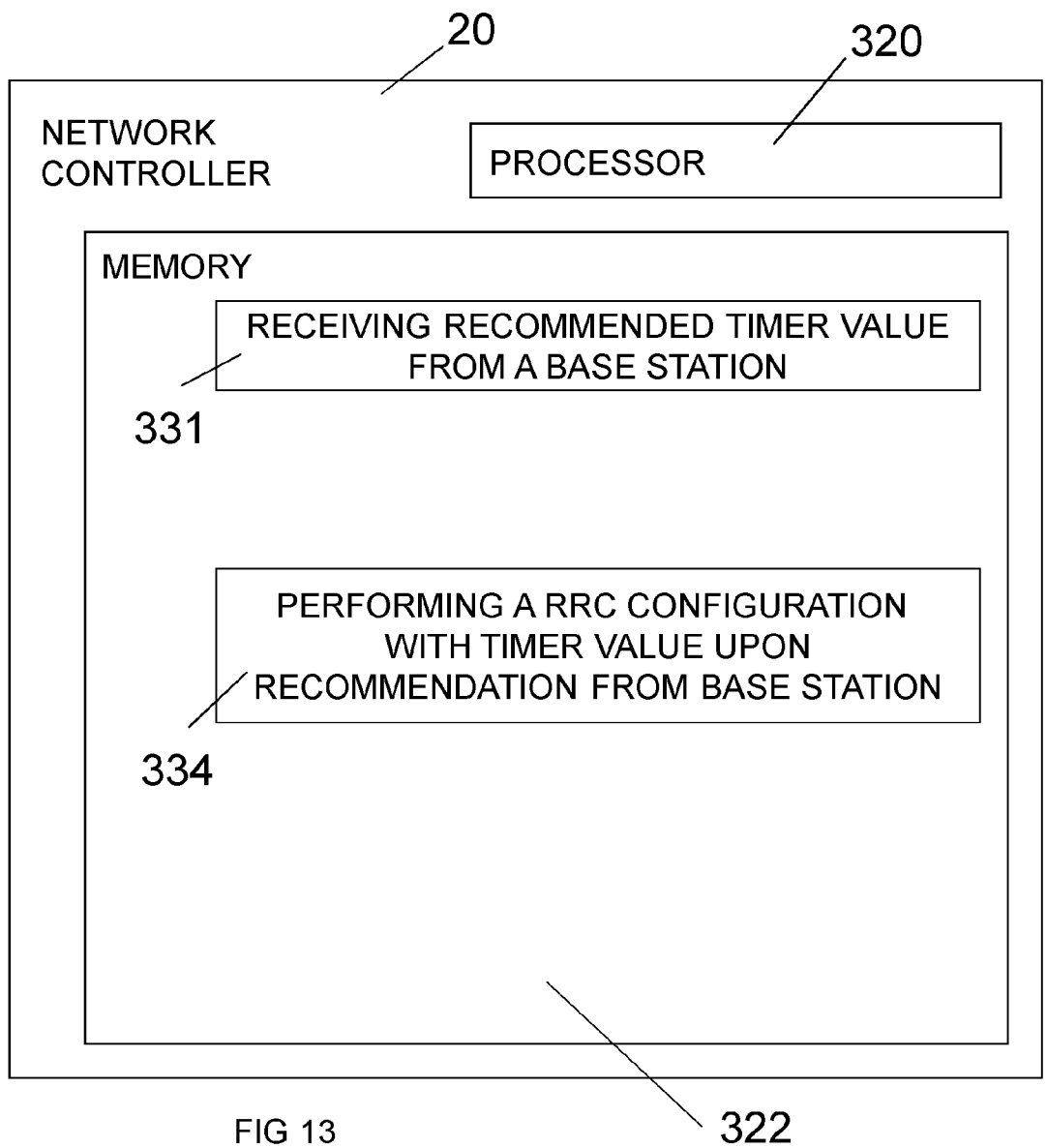
FIG. 13 illustrates an embodiment of a network controller.

FIG. 13 is a schematic block diagram illustrating an example of a network controller 20 comprising a processor 320 and an associated memory 322.

The computer program residing in memory may thus be organized as appropriate function modules configured to perform, when executed by the processor, at least part of the steps and/or tasks described herein. An example of such function modules is illustrated in FIG. 13. Function component 331 may implement the functionality of receiving a recommended timer value for RRC configuration from a Node B to which a particular UE is connected. Function component 334 may implement the functionality of performing a RRC configuration comprising a timer value upon recommendation from Node B.

In other words, a Node B for assisting in RRC configuration comprises an obtaining module and a transmitting module. The obtaining module obtains UE condition parameters concerning a particular UE connected to the Node B. The UE condition parameters comprise at least a round trip time and a scheduler processing time. The transmitting module transmits, from the Node B to a RNC, the UE condition parameters. The UE condition parameters constitute implicit recommendations for a RRC configuration.

Figure 14:
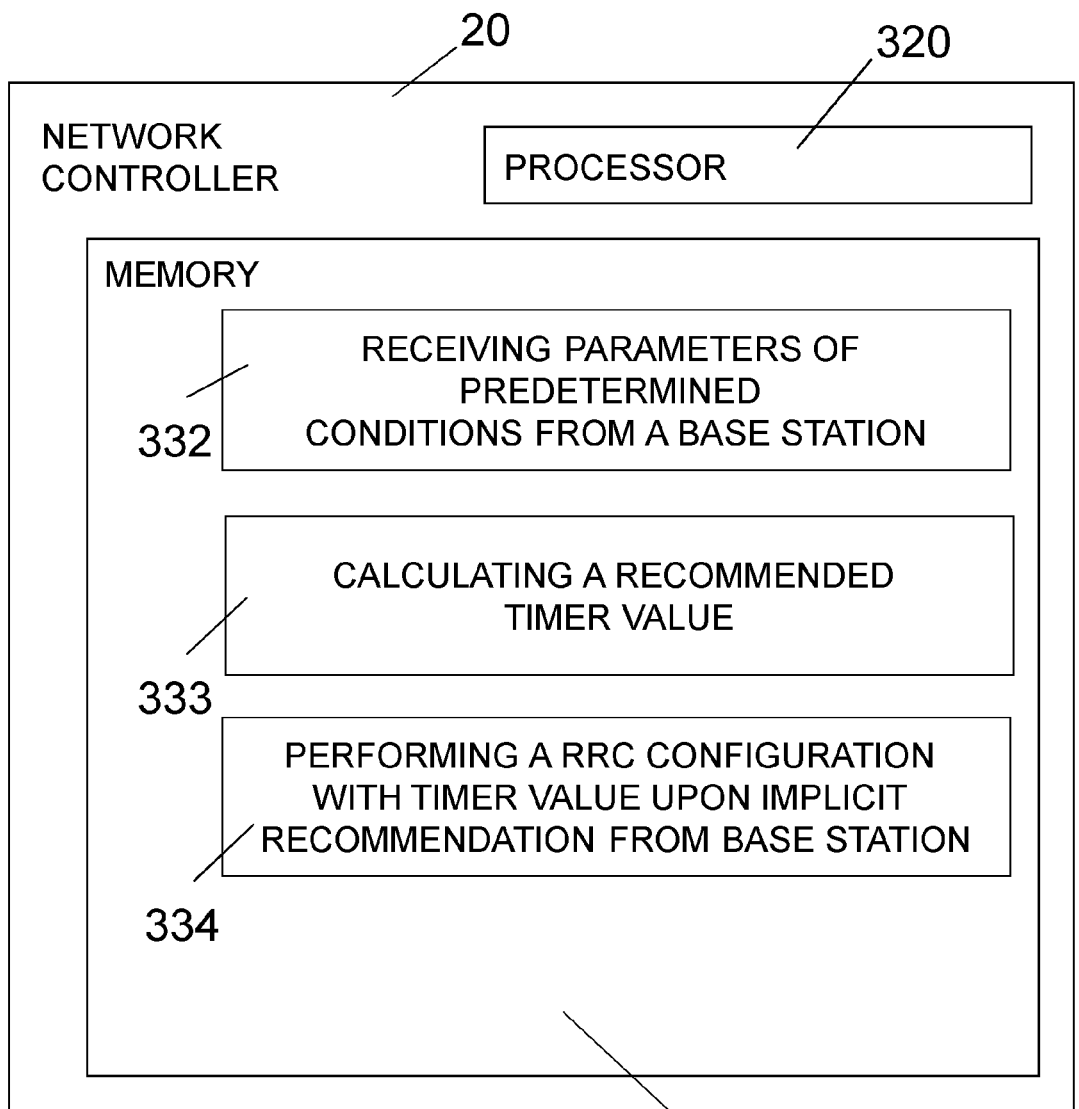
FIG. 14 illustrates another embodiment of a network controller.

FIG. 14 is a schematic block diagram illustrating an example of a network controller 20 comprising a processor 320 and an associated memory 322.

The computer program residing in memory may thus be organized as appropriate function modules configured to perform, when executed by the processor, at least part of the steps and/or tasks described herein. An example of such function modules is illustrated in FIG. 14. Function component 332 may implement the functionality of receiving parameters of predetermined conditions associated with a particular UE at the particular time from a Node B to which a particular UE is connected. Function component 333 may implement the functionality of calculating a recommended timer value for RRC configuration in dependence of the received parameters of predetermined conditions Function component 334 may implement the functionality of performing a RRC configuration comprising a timer value upon implicit recommendation from Node B.

In other words, a RNC for configuration of RRC comprises a receiving module, a calculating module and a configuration module. The receiving module receives, from a Node B, UE condition parameters concerning a particular UE connected to the Node B. The UE condition parameters comprise at least a round trip time and a scheduler processing time. The calculating module calculates a timer value recommendation for the particular UE in dependence on the UE condition parameters. The timer value recommendation is equal or larger than a sum of the round trip time and the scheduler processing time. The configuration module performs a RRC configuration with a timer value according to the timer value recommendation. The RRC configuration is thereby performed implicitly recommended by the Node B.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

ACK/NAK ACKnowledgement/Negative AcKnowledgement
AP Access Point
ASIC Application Specific Integrated Circuit
ARQ Automated Repeat-reQuest
BS Base Station
BSC Base Station Controller
BTS Base Transceiver Station
CA Carrier Aggregation CD Compact Disc
CDMA2000 Code Division Multiple Access 2000
CPE Customer Premises Equipment
CPU Central Processing Unit
CQI Channel-Quality Indicator
CRC Cyclic Redundancy Check
CSI Channel State Information
DAS Distributed Antenna System
DSP Digital Signal Processor
DVD Digital Versatile Disc
DL DownLink
eNodeB evolved Node B
FDD Frequency Division Duplex
FPGA Field Programmable Gate Array
GERAN GSM EDGE RAN
GSM Global System for Mobile communication
HDD Hard Disk Drive
HARQ Hybrid ARQ
HSDPA High-Speed Downlink Packet Access
HS-DPCCH High-Speed Dedicated Physical Control Channel
HSPA High-Speed Packet Access
HS-PDSCH High-Speed Physical Downlink Shared Channel
HS-SCCH high-speed shared control channel
LEE laptop embedded equipped
LME laptop mounted equipment
LTE Long Term Evolution
M2M machine to machine
MC multicarrier
MIMO Multiple-Input Multiple-Output
MSR Multi-Standard Radio
Node B Node B
PC Personal Computer
PDA Personal Digital Assistant
PLC Programmable Logic Controller
RAB Radio Bearers
RAM Random Access Memory
RAT Radio Access Technology
RNC Radio Network Controller
ROM Read-Only Memory
RRC Radio Resource Control
SIR Signal-to-Interference Ratio
TDD Time Division Duplex
TTI Transmission Time Interval
UE User equipment
USB Universal Serial Bus
UTRA Universal Terrestrial Radio Access
WiMax Worldwide Interoperability for Microwave ACCess
WLAN Wireless Local Area Network

The invention claimed is:

1. A method for assisting in Radio Resource Control configuration, wherein said method comprises the steps of:
obtaining, in a Node B, User Equipment condition parameters concerning a particular User Equipment connected to said Node B, said User Equipment condition parameters comprising at least a round-trip time and a scheduler processing time;
calculating, in said Node B, a timer value recommendation for said particular User Equipment in dependence on said User Equipment condition parameters, wherein said timer value recommendation is equal or larger than a sum of said round-trip time and said scheduler processing time; and
transmitting, from said Node B to a Radio Network Controller, said timer value recommendation.

2. The method of claim 1, wherein said timer value recommendation is equal to a sum of said round-trip time, said scheduler processing time and an offset value.

3. The method of claim 2, wherein said User Equipment condition parameters further comprises a load of a cell to which said particular User Equipment is connected, and wherein said offset is determined dependent on said load of said cell.

4. The method of claim 2, wherein said offset is given a first offset value if said load of said cell exceeds a predetermined threshold and said offset is given a second offset value if said load of said cell does not exceed said predetermined threshold, said first offset value being larger than said second offset value.

5. A method for assisting in Radio Resource Control configuration, wherein said method comprises the steps of:
obtaining, in a Node B, User Equipment condition parameters concerning a particular User Equipment connected to said Node B, said User Equipment condition parameters comprising at least a round-trip time and a scheduler processing time;
transmitting, from said Node B to a Radio Network Controller, said User Equipment condition parameters, wherein said User Equipment condition parameters constitute implicit recommendations for a Radio Resource Control configuration.

6. A method for Radio Resource Control configuration, wherein said method comprises the steps of:
receiving, in a Radio Network Controller from a Node B, User Equipment condition parameters concerning a particular User Equipment connected to said Node B, said User Equipment condition parameters comprising at least a round-trip time and a scheduler processing time;
calculating, in said Radio Network Controller, a timer value recommendation for said particular User Equipment in dependence on said User Equipment condition parameters, wherein said timer value recommendation is equal or larger than a sum of said round-trip time and said scheduler processing time; and
performing, by said Radio Network Controller, a Radio Resource Control configuration with a timer value according to said timer value recommendation, whereby said Radio Resource Control configuration is performed as implicitly recommended by said Node B.

7. The method of claim 6, wherein said timer value recommendation equal to a sum of said round-trip time, said scheduler processing time and an offset value.

8. The method of claim 7, wherein said User Equipment condition parameters further comprises a load of a cell to which said particular User Equipment is connected, and wherein said offset is determined dependent on said load of said cell.

9. The method of claim 7, wherein said offset is given a first offset value if said load of said cell exceeds a predetermined threshold and said offset is given a second offset value if said load of said cell does not exceed said predetermined threshold, said first offset value being larger than said second offset value.

10. A Node B configured to assist in Radio Resource Control configuration,
wherein said Node B is configured to obtain User Equipment condition parameters concerning a particular User Equipment connected to said Node B, said User Equipment condition parameters comprising at least a round-trip time and a scheduler processing time;
wherein said Node B is configured to calculate a timer value recommendation for said particular User Equipment in dependence on said User Equipment condition parameters, wherein said timer value recommendation is equal or larger than a sum of said round-trip time and said scheduler processing time; and
wherein said Node B is configured to transmit, from said Node B to a Radio Network Controller, said timer value recommendation.

11. The Node B of claim 10, wherein said Node B comprises a processor and a memory, said memory comprising instructions executable by the processor, whereby the processor is operative to obtain said User Equipment condition parameters concerning said particular User Equipment connected to said Node B and to calculate said timer value recommendation for said particular User Equipment in dependence on said User Equipment condition parameters.

12. The Node B of claim 10, wherein the Node B comprises communication circuitry configured to transmit, from said Node B to said Radio Network Controller, said timer value recommendation.

13. A Node B configured to assist in Radio Resource Control configuration,
wherein said Node B is configured to obtain User Equipment condition parameters concerning a particular User Equipment connected to said Node B, said User Equipment condition parameters comprising at least a round-trip time and a scheduler processing time; and
wherein said Node B is configured to transmit, from said Node B to a Radio Network Controller, said User Equipment condition parameters;
whereby said User Equipment condition parameters constitute implicit recommendations for a Radio Resource Control configuration.

14. The Node B of claim 13, wherein said Node B comprises a processor and a memory, said memory comprising instructions executable by the processor, whereby the processor is operative to obtain said User Equipment condition parameters concerning said particular User Equipment connected to said Node B.

15. The Node B of claim 13, wherein the Node B comprises communication circuitry configured to transmit, from said Node B to said Radio Network Controller, said User Equipment condition parameters.

16. A Radio Network Controller configured to configure Radio Resource Control,
wherein said Radio Network Controller is configured to receive, from a Node B, User Equipment condition parameters concerning a particular User Equipment connected to said Node B, said User Equipment condition parameters comprising at least a round-trip time and a scheduler processing time;
wherein said Radio Network Controller is configured to calculate a timer value recommendation for said particular User Equipment in dependence on said User Equipment condition parameters, wherein said timer value recommendation is equal or larger than a sum of said round-trip time and said scheduler processing time; and
wherein said Radio Network Controller is configured to perform a Radio Resource Control configuration with a timer value according to said timer value recommendation, whereby said Radio Resource Control configuration is performed as implicitly recommended by said Node B.

17. The Radio Network Controller of claim 16, wherein the Radio Network Controller comprises a processor and a memory, said memory comprising instructions executable by the processor, whereby the processor is operative to calculate said timer value recommendation for said particular User Equipment in dependence on said User Equipment condition parameters and to perform said Radio Resource Control configuration with said timer value according to said timer value recommendation.

18. The Radio Network Controller of claim 16, wherein the Radio Network Controller comprises communication circuitry configured to receive, from said Node B, User Equipment condition parameters concerning said particular User Equipment connected to said Node B.

* * * * *